United States Patent Office 3,044,994
Patented July 17, 1962

---

3,044,994
POLYMERS CONTAINING RECURRING
1,2,4-OXADIAZOLE RINGS
Dale Clifton Blomstrom, Wilmington, Del., assignor to
E. I. du Pont de Nemours and Company, Wilmington,
Del., a corporation of Delaware
No Drawing. Filed Mar. 19, 1959, Ser. No. 800,383
13 Claims. (Cl. 260—78)

This invention relates to novel nitrogen-containing polymers obtained by the reaction of diamidoximes with a dicarboxylic acid or amide-forming derivatives thereof. This invention further relates to polymers containing recurring 1,2,4-oxadiazole rings.

Polymers resulting from the reaction of dicarboxylic acids with diamines have had considerable commercial success. In general, polyamides are strong and resist abrasion. They are relatively unaffected by water. However, conventional polyamides undergo some degradation when subjected to light, particularly in the ultraviolet, and loss of strength under hydrolytic conditions.

This invention has as an object the production of new and useful polymers by the reaction of diamidoximes with a dibasic acid or amide-forming derivative thereof. A further object is provision of polymers having recurring intralinear 1,2,4-oxadiazole units. A still further object is to provide polymers which are resistant to hydrolysis. Other objects will appear hereinafter.

These and other objects are accomplished by reacting diamidoximes with dibasic carboxylic acids, including polymer-forming derivatives as more fully described below. The polymeric products finally resulting from this reaction contain recurring 1,2,4-oxadiazole intralinear rings.

The monomers employed in the polymer-forming reaction of this invention are (1) diamidoximes, i.e., compounds of the formula

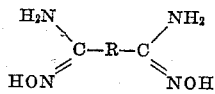

wherein R represents a bond joining the two functional groups or an inert divalent radical, particularly aliphatic and aromatic hydrocarbon, and (2) dibasic carboxylic acids or their amide-forming derivatives, i.e., compounds of the formula

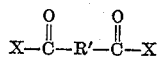

wherein R' is a bond or divalent radical as described for R and X represents a replaceable monoradical known to enter polyamide-forming reactions, including hydroxyl, alkoxyl, mercaptan, halogen, amide radicals, or salt groups.

Reaction of the two monomers gives polymeric acyl derivative of the amidoxime which can be converted into polymer containing recurring 1,2,4-oxadiazole intralinear rings as illustrated by the equation:

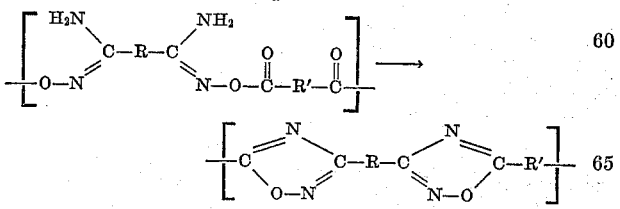

The first or polymeric acyl generally results when the diamidoxime and dibasic acid or derivative are reacted at relatively low temperatures. The polymer containing substantial amounts of the 1,2,4-oxadiazole results by elimination of water from the O-acyl generally by use of higher temperature with or without a catalyst or acid acceptor.

The following examples further illustrate the preparation and properties of the polymers of this invention.

EXAMPLE 1

*Reaction of Adipamide Dioxime and Adipyl Chloride*

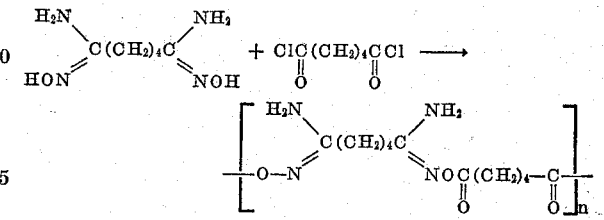

A solution of 3 g. (0.0172 mole) of adipamide dioxime and 2.75 g. (0.0348 mole) of pyridine in 35 ml. of dimethylformamide and a solution of 3.15 g. (0.0172 mole) of adipyl chloride in 35 ml. of dioxane were added simultaneously with stirring with a 30-minute period to 50 ml. of dimethylformamide. After the solution was stirred for 30 additional minutes, it was poured into water, and the polymer was isolated by filtration and washed with methanol. Yield was 3.2 g. (66%), M.P. 140–150° C.

*Analysis.*—Calcd. for $C_{12}H_{20}N_4O_4$: C, 50.7; H, 7.05. Found: C, 51.8; H, 6.92.

$[\eta]_{inh} = 0.18$ (0.2% in dimethylformamide).

EXAMPLE 2

*Fusion of Polymeric O-Adipyl Derivative of Adipamide Dioxime to a Polymeric 1,2,4-Oxadiazole*

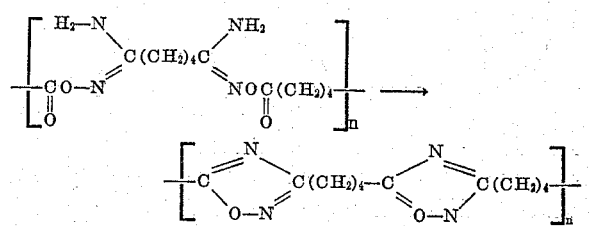

A 1-g. sample of the polymer described in Example 1 above was heated above its melting point for one hour in a bath at 150° C. There was a brisk evolution of bubbles. The melt was cooled, dissolved in dimethylformamide, and precipitated by pouring into methanol, giving 0.64 g. of buff solid, M.P. 99–103° C., $[\eta]_{inh}$ = 0.09 (0.2% in dimethylformamide). A sample of a polymer made in the same manner had elemental analyses and IR spectrum corresponding to the polyoxadiazole structure.

EXAMPLE 3

*Solution Polymerization of Terephthalamide Dioxime and Isophthaloyl Chloride*

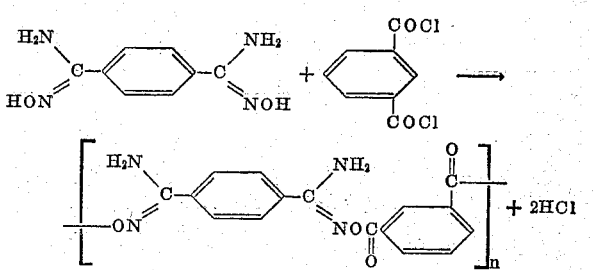

A solution of 0.970 g. (0.005 mole) of pure terephthalamide dioxime in 15 ml. of dry dimethylacetamide in a small dry flask fitted with a mechanical stirrer and swept continuously with dry nitrogen was stirred and chilled in a Dry-Ice acetone bath until a solid mush formed. Then 1.015 g (0.005 mole) of pure isophthaloyl chloride was added. The Dry Ice bath was replaced with ice and gentle stirring was resumed. After five minutes at 0° C. the reaction was allowed to warm to room temperature. Approximately five minutes after the addition of the acid chloride, a dropwise addition of 1.490 g. (0.010 mole) of diethylaniline was begun. This addition required about 20 minutes. After two hours of stirring, the solution had become somewhat viscous. To it there was added 2 ml. of acetic anhydride and the solution was heated at 50–60° C. for two hours. The solution was poured into water in a Waring blendor and the polymer was isolated by filtration. The fluffy white polymer melted with decomposition at a temperature above 300° C. Its inherent viscosity was 1.13 (0.2% in dimethylacetamide).

*Analysis.*—Calcd. for $C_{16}H_{12}N_4O_4$: C, 59.28; H, 3.71; N, 17.29. Found: C, 59.05; H, 4.15; N, 16.50.

The infrared spectrum was in good agreement with the proposed structure. Films cast from dimethylacetamide showed these physical properties: tensile strength, 9500 lb./sq. in.; elongation, 6.6%; modulus in tension, 379,000 lb./sq. in. The films were unaffected by organic solvents but were degraded by boiling water.

EXAMPLES 4–20

Using the general procedure of Example 3 with various combinations of stoichiometric amounts of diamidoximes and dibasic acid chlorides with solvents and acid acceptors, other polymeric O-acyl diamidoximes were similarly obtained. The following table summarizes the variables in the examples. In the table, inherent viscosities were measured in (*a*) dimethylacetamide (0.2%), (*b*) trifluoroacetic acid (0.2%), (*c*) conc. sulfuric acid (0.5%), and (*d*) dimethylformamide (0.2%).

TABLE I

| Example | Diamidoxime | Diacid Chloride | Solvent | Acid Acceptor | Viscosity |
|---|---|---|---|---|---|
| 4 | terephthalamide | sebacyl | dimethylacetamide | diethylaniline | 0.43ᵃ. |
| 5 | sebacamide | isophthaloyl | do | do | 0.30ᵇ. |
| 6 | do | do | do | Na₂HPO₄ | 0.64ᵇ. |
| 7 | do | do | do | Li₂CO₃ | 0.21ᵇ. |
| 8 | do | do | dimethyltetramethylene sulfone | Na₂HPO₄ | 0.17ᵇ. |
| 9 | do | do | hexamethyl phosphoramide | none | 0.09ᶜ. |
| 10 | do | sebacyl | dimethylacetamide | Na₂HPO₄ | 0.04ᶜ. |
| 11 | do | do | do | triethylamine | 0.19ᵇ. |
| 12 | terephthalamide: sebacamide (76: 24 molar ratio) | isophthaloyl | do | diethylaniline | 0.59ᵃ. |
| 13 | oxamide | do | do | Na₂HPO₄ | insoluble. |
| 14 | adipamide | do | do | triethylamine | 0.17ᵇ |
| 15 | sebacamide | do | do | pyridine | 0.11ᵃ. |
| 16 | do | do | diethylcyanamide | none | 0.08ᶜ. |
| 17 | oxamide | adipyl | dioxane | triethylamine | 0.31ᵇ. |
| 18 | do | do | do | NaOH | 0.22ᵇ. |
| 19 | adipamide | do | dimethyl sulfoxide | triethylamine | 0.06ᵈ. |
| 20 | do | do | acetone | NaHCO₃ | 0.07ᵈ. |

EXAMPLE 21

*Interfacial Polymerization of Adipamide Dioxime and Isophthaloyl Chloride*

A solution of 3.00 g. (0.0172 mole) of adipamide dioxime in 100 ml. water and 50 ml. of benzene was stirred vigorously in a Waring Blendor. A solution of 1.49 g. (0.037 mole) of sodium hydroxide in 50 ml. of water was added, and then a solution of 3.50 g. (0.0172 mole) of isophthaloyl chloride in 100 ml. of benzene was added all at once. After a few seconds, a white solid separated in a mass which slowed the stirrer. Stirring was continued for 15 minutes, and the mixture was filtered. The solid was stirred with methanol, removed by filtration, and dried. The yield of polymer was 5.2 g., M.P. 180° C. (dec.), inherent viscosity=0.31 (0.2% in dimethylformamide).

Using the above general procedure, terephthalamide dioxime and adipyl chloride were also used in this type of polymerization. Chloroform and carbon tetrachloride were used in place of benzene, and sodium bicarbonate and sodium carbonate were used as bases.

EXAMPLE 22

*Polymers From Fusion of Diamidoximes and Dicarboxylic Acids*

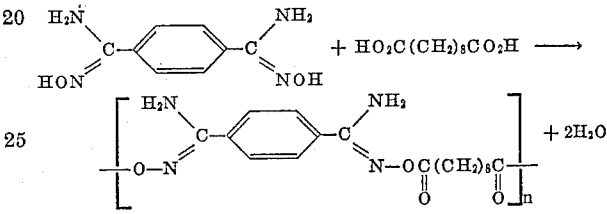

Two grams of terephthalamide dioxime and 2.08 g. of sebacic acid were ground together, placed in a tube, and immersed in a 150° C. oil bath. The solid melted to a thick, foaming mass. A slow stream of dry nitrogen was passed through the melt. Heating was continued for five hours. The cooled brown solid was washed from the tube with dimethylformamide. The insoluble polymer weighed 1.40 g. (38% yield). Its inherent viscosity was 0.16 (0.2% in trifluoroacetic acid). The infrared spectrum of the polymer showed it to be mainly a poly O-acyl amidoxime structure with some 1,2,4-oxadiazole units present. Fusion of sebacic acid monoamidoxime,

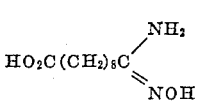

gave a similar result.

EXAMPLE 23

*Polymers From Fusion of Diamidoximes and Dicarboxylic Esters*

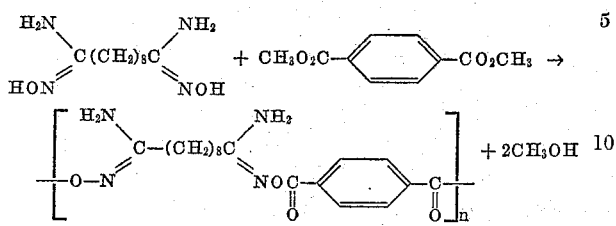

One gram of sebacamide dioxime, 0.85 g. of dimethyl terephthalate, and 0.05 g. of zinc oxide were fused together in a nitrogen atmosphere at 160–170° C. for 2½ hours. The tan solid polymer was washed with methanol and dried. Its inherent viscosity was 0.14 (0.2% in trifluoroacetic acid). Other combinations of diamidoximes and diesters with metal oxide catalysts gave comparable results.

EXAMPLE 24

*Polymers From Fusion of Diamidoximes and N,N'-Adipyl Imidazole*

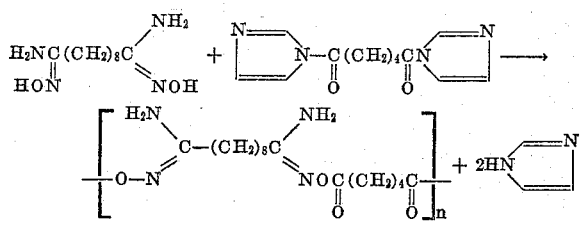

A mixture of 1.022 g. (0.0042 mole) of N,N'-adipyl imidazole and 0.955 g. (0.0042 mole) of sebacamide dioxime was heated in a small dry flask at 120° C. in an oil bath. The mixture melted to a yellow viscous liquid. The temperature was held at 120° C. for two hours and then was raised to 160° C. over a two-hour period. The liquid became reddish amber, and on cooling it dried to a dark brown cake. The inherent viscosity of the polymer was 0.18 (0.2% in trifluoroacetic acid).

EXAMPLE 25

*Polymers by Reaction of Diamidoximes With Diphenyl Dithiolsebacate*

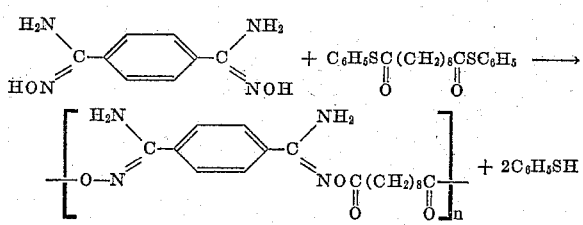

A suspension of 0.5 g. (0.0026 mole) of terephthalamide dioxime and 1.00 g. (0.0026 mole) of diphenyl dithiolsebacate in 5 ml. of dimethylacetamide was heated in an oil bath at 70° C. A clear solution resulted and after a few minutes a white solid appeared. Heating at 70–75° C. was continued for two hours, and then the suspension of white solid was poured into methanol, filtered, and washed well with methanol. The solid weighed 0.67 g. (72% yield). Its inherent viscosity was 0.31 (0.2% in trifluoroacetic acid). Heating terephthalamide dioxime and diphenyl dithiolsebacate in an oil bath at 175–200° C. for six hours at 1 mm. pressure resulted in a polymer with inherent viscosity of 0.16 (0.2% in trifluoroacetic acid).

EXAMPLE 26

*Polymers by Reaction of Diamidoximes With the Pyridine Complex of Isophthaloyl Chloride*

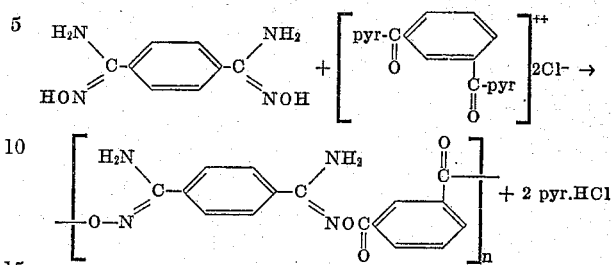

To a stirred solution of 0.88 g. of terephthalamide dioxime in dimethylacetamide there was added a suspension of 1.63 g. of pyridine-isophthaloyl chloride complex in dimethylacetamide. After two hours the solution was poured into aqueous methanol, and the precipitate was filtered. The polymer weighed 0.64 g.; inherent viscosity=0.06 (0.2% in dimethylformamide).

EXAMPLE 27

*Polymeric 1,2,4-Oxadiazoles by the Action of Chemical Agents on Polymeric O-Acyl Diamidoximes*

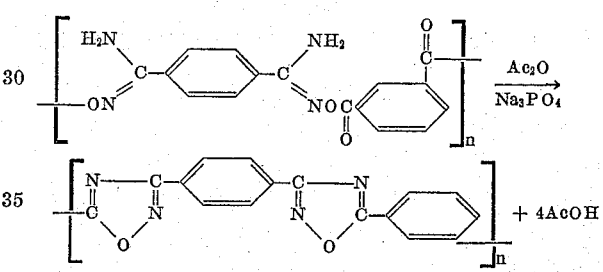

A solution of 0.35 g. of high molecular weight polymer from terephthalamide dioxime and isophthaloyl chloride, 2 ml. of acetic anhydride, and 0.2 g. of trisodium phosphate in 25 ml. of dimethylacetamide was heated at 150° C. for three hours. The solution was poured into methanol, washed with water, and dried. The infrared spectrum of the polymer indicates that most, but not all, of the O-acylamidoxime groups were cyclized to 1,2,4-oxadiazole rings.

Similar products were obtained when sodium acetate, arsenious oxide, or zinc oxide was substituted for trisodium phosphate as the basic catalyst.

EXAMPLE 28

*Polymeric 1,2,4-Oxadiazoles by Heating Polymeric O-Acyl Diamidoximes in Dimethyl Sulfoxide Solution*

A solution of 0.5 g. of polymer from terephthalamide dioxime and isophthaloyl chloride in 25 ml. of dimethyl sulfoxide was heated at 140° C. for 40 minutes. A flocculent yellow solid precipitated. The mixture was poured into methanol, washed with methanol, and dried. The yield of product was 0.36 g. Its infrared spectrum shows that the O-acyl diamidoxime groups were substantially cyclized to 1,2,4-oxadiazole rings.

EXAMPLE 29

*Polymeric 1,2,4-Oxadiazoles by Dry Heating of Polymeric O-Acyl Diamidoximes*

A sample of polymer from terephthalamide dioxime and isophthaloyl chloride in the form of a thin film was heated in an evacuated tube in a metal bath at 275° C. for 10 minutes. Dehydration occurred even though the film did not melt. The infrared spectrum of the brittle amber film thus formed showed it to be largely polymeric 1,2,4-oxadiazole.

Temperatures from 175–300° C. can be used by vary-

EXAMPLE 30

*Polymeric 1,2,4-Oxadiazoles by Fusion of Polymeric O-Acyl Diamidoximes*

A powdered sample of polymer from sebacamide dioxime and isophthaloyl chloride was heated in an evacuated flask at 150–180° C. for four hours. The solid melted and bubbles of water vapor were evolved. After cooling, the dark-brown solid was dissolved in dimethylacetamide and precipitated with ethyl acetate. Its infrared spectrum showed it to be a polyoxadiazole. The inherent viscosity was 0.54 compared to 0.29 for the starting material.

As shown by the preceding examples, the polymers of this invention have a plurality of either or both of the linear unit

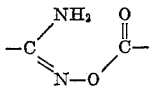

or the cyclic dehydration product

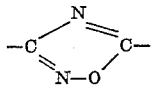

The polymers preferably have a relatively high molecular weight, the more useful ones having an inherent viscosity of 0.1 or higher, and in general a molecular weight of at least 2000.

In general the first polymeric product of the polymer-forming reaction of the present invention does not contain oxadiazole rings, i.e., a 5-membered heterocyclic ring having one oxygen and two nitrogen atoms, of which one of the latter is directly bonded to two carbon atoms. The first condensation product involves reaction of the hydroxylamino group with the dicarboxylic acid or a derivative of the dicarboxylic acid. Since the product thus has the hydroxylamino oxygen attached to carboxy or acyl carbon, it has been called a polymeric O-acyl derivative. These new polymers have the repeating unit

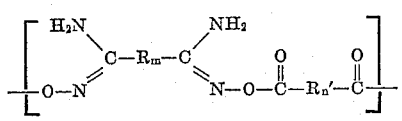

wherein R and R' can be the same or different and represent the means of joining two similar carbons of the

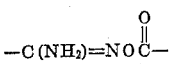

recurring groups, and $m$ and $n$ represent the same or different cardinal numbers form 0–1, R and R' can be an inert divalent radical including hydrocarbon, especially alkylene and arylene diradicals of up to and including 10 carbons. R and R' can represent simply a bond (in the case of reaction products from oxamide dioxime or oxalyl dichloride). The preferred values for R and R' thus include —$(CH_2)_y$— wherein $y$ is a number of 0–10 and $C_6H_4$. In other words, R and R' include alkylene and arylene.

The new polymers containing a plurality of the O-acyl units are useful for the preparation of films and fibers by the means conventional in the polyamide art. It is generally difficult to obtain polymers having the recurring O-acyl units in extremely high molecular weight. These polymers are susceptible to reaction and modification by virtue of the presence of the O-acyl units. Heating or use of dehydration conditions converts the O-acyl units to the 1,2,4-oxadiazole ring structure. The latter are generally of higher viscosity and are highly resistant to hydrolysis. Films and fibers prepared from the latter are useful for products that are subjected to acid or alkaline conditions as well as to heat and ultraviolet light.

The polymers having recurring 1,2,4-oxadiazole units, that is, those having the general structure unit

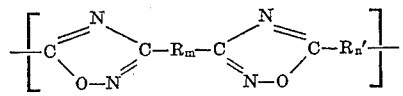

wherein R, R', $m$ and $n$ have the same significance as indicated above, are particularly important since they are relatively inert. They are stable to hydrolytic conditions that break the bonds of linear non-cyclic polyamides.

As already mentioned, polymers of this invention are prepared by starting with diamidoximes which can be represented by the formula

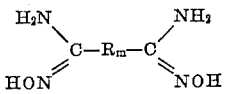

wherein R and $m$ have the same significance as above. These amidoximes are obtained by the general process described by Lamb and White, J. Chem. Soc. 1939, 1253. Amidoximes that are useful include those of the formula

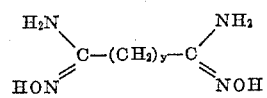

wherein $y$ is a number of 0–10 or even higher, e.g., as in oxamide dioxime, malonamide dioxime, succinamide dioxime, glutaramide dioxime, and decane diamide dioxime. Also included are arylene radicals of up to 10 carbons, e.g., as in the phthalamide dioximes and naphthalene-1,8-diamide dioxime.

Diamide dioximes as described above react with dibasic carboxylic acids or their amide-forming derivatives under suitable reaction conditions to give the new polymers containing the recurring O-acyl unit. The dibasic acids and derivatives can be represented by the formula

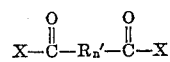

wherein R' and $n$ have the values previously assigned and where X is a replaceable radical known to form amides with amines or esters with alcohols. Preferably, X is a radical selected from the group consisting of hydroxyl, alkoxyl, amino, thio, and halogen. In place of hydroxyl, i.e. dibasic carboxylic acids, salts of the acids can be used, e.g., amine and amide salts as well as alkali metal salts. For ease of reaction with the diamidoximes, it is preferred that X have a molecular weight of less than about 150.

The above dibasic acids and derivatives are recognized in polymer literature as polyamide-forming dibasic carboxylic compounds.

The conditions whereby polymers are formed from the diamidoximes and the dibasic carboxylic acid (or equivalent polyamide-forming derivative thereof) are subject to wide variation. They depend primarily on the reactivity of the acid or derivative. Temperatures for the reaction vary from below room temperature to the decomposition temperature of the polymer containing a plurality of the 1,2,4-oxadiazole units. The temperature range thus can vary from —80 to 300° C. Low temperatures, e.g., 0 to —50° C. or below, are employed when dibasic acid chlorides are used while higher temperatures, e.g., 100–200 or above, are useful when dibasic acid is fused with the diamidoximes.

The presence or absence of inert solvents or diluents in carrying out the process of this invention depends on the method of reaction. When a dibasic acid is fused with the diamidoximes, solvents are generally undesired. Inert solvents are useful for some of the polymer-forming reactions that can be employed. Such solvents should dissolve the polymer-forming reactants as well as the polymer to form homogeneous reaction conditions. The solvents should be readily removed from the polymer, e.g., by extraction with water or evaporation.

In the reaction of diamidoximes with dibasic carboxylic acid, or amide-forming derivative thereof, there is first obtained, as previously pointed out, a polymer having a plurality of non-cyclic O-acyl units. When relatively mild conditions are used for the polymerizing reaction, the polymer isolated by conventional means has few if any oxadiazole units. The latter are obtained by further heating, e.g., at 150–300° C. of O-acyl containing polymer whereby the heterocycle units are formed through the removal of water.

Polymers which have all, or at least the major portion, of the O-acyl units converted to 1,2,4-oxadiazole ring structures have increased viscosity and high softening points, decreased solubility, and increased stability toward hydrolytic or attack by ultraviolet light. The polymers of this invention are useful for the preparation of films and fibers. Films are particularly useful for packaging foods, particularly vegetables.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

I claim:

1. Polymers consisting essentially of recurring units of the formula $$\left[ \begin{array}{c} H_2N \quad\quad NH_2 \\ \phantom{x}\diagdown C-R-C \diagdown \\ -O-N \quad\quad\quad N-O-\overset{O}{\underset{\|}{C}}-R'-\overset{O}{\underset{\|}{C}}- \end{array} \right]$$

wherein R and R′ represent inert divalent hydrocarbon radicals having up to and including 10 carbon atoms.

2. Polymers consisting essentially of recurring 1,2,4-oxadiazole units represented by the formula $$\left[ -C\underset{O-N}{\overset{N}{\diagup\!\!\!\diagdown}} C-R-C \underset{N-O}{\overset{N}{\diagdown\!\!\!\diagup}} C-R'- \right]$$

wherein R and R′ represent inert divalent hydrocarbon radicals having up to and including 10 carbon atoms.

3. The products of claim 12 characterized by having an inherent viscosity of at least 0.1 and a molecular weight of at least 2000.

4. Polymeric products of claim 12 in the form of shaped structures.

5. Polymeric products of claim 12 in the form of a self-supporting film.

6. Polymeric products of claim 12 in the form of a fiber.

7. A polymer consisting essentially of recurring units of the formula $$\left[ -C\underset{O-N}{\overset{N}{\diagup\!\!\!\diagdown}} C-(CH_2)_4-C\underset{N-O}{\overset{N}{\diagdown\!\!\!\diagup}} C(CH_2)_4- \right]$$

8. A polymer consisting essentially of recurring units of the formula $$\left[ \begin{array}{c} H_2N \quad\quad NH_2 \\ \phantom{x}\diagdown C-(CH_2)_4-C\diagdown \\ -O-N \quad\quad\quad NOC-(CH_2)_4C- \\ \phantom{xxxxxxxxxxxxxx}\underset{\|}{O}\quad\quad\underset{\|}{O} \end{array} \right]$$

9. Polymers consisting essentially of recurring units of the formula $$\left[ \begin{array}{c} H_2N \quad\quad\quad\quad NH_2 \quad\quad\quad\quad O \\ \phantom{x}\diagdown C-\!\!\bigcirc\!\!-C \diagdown \quad\quad\quad \|\\ -O-N \quad\quad\quad NOC-\!\!\bigcirc\!\!- \\ \phantom{xxxxxxxxxxxxxx}\underset{\|}{O} \end{array} \right]$$

10. Process which comprises reacting a diamidoxime selected from the class consisting of compounds of the formulas $$\begin{array}{cc} H_2N \quad NH_2 & H_2N \quad\quad NH_2 \\ \diagdown C-C \diagdown \text{ and } & \diagdown C-R-C\diagdown \\ HON \quad NOH & HON \quad\quad NOH \end{array}$$

wherein R represents an inert divalent hydrocarbon radical having up to and including 10 carbon atoms, and a polyamide-forming dibasic carboxylic compound selected from the class consisting of compounds of the formulas $$X-\overset{O}{\underset{\|}{C}}-\overset{O}{\underset{\|}{C}}-X \text{ and } X-\overset{O}{\underset{\|}{C}}-R'-\overset{O}{\underset{\|}{C}}-X$$

wherein R′ represents an inert divalent hydrocarbon radical having up to and including 10 carbon atoms and X is a member of the group consisting of hydroxyl, alkoxyl, mercaptan, halogen, amino radical and salt groups.

11. Process which comprises reacting a diamidoxime selected from the class consisting of compounds of the formulas $$\begin{array}{cc} H_2N \quad NH_2 & H_2N \quad\quad NH_2 \\ \diagdown C-C \diagdown \text{ and } & \diagdown C-R-C\diagdown \\ HON \quad NOH & HON \quad\quad NOH \end{array}$$

wherein R represents an inert divalent hydrocarbon radical having up to and including 10 carbon atoms, and a member of the group consisting of compounds of the formulas $$X-\overset{O}{\underset{\|}{C}}-\overset{O}{\underset{\|}{C}}-X \text{ and } X-\overset{O}{\underset{\|}{C}}-R'-\overset{O}{\underset{\|}{C}}-X$$

wherein R′ represents an inert divalent hydrocarbon radical having up to and including 10 carbon atoms, and X is a member of the group consisting of hydroxyl, alkoxyl, mercaptan, halogen, amino radical and salt groups, and eliminating water from the resulting polymeric O-acyl derivative having a repeating unit selected from the group consisting of those of the following formulas $$\left[ \begin{array}{c} H_2N \quad\quad NH_2 \\ \phantom{x}\diagdown C-C\diagdown \\ -O-N \quad\quad\quad N-O-\overset{O}{\underset{\|}{C}}-\overset{O}{\underset{\|}{C}}- \end{array} \right]$$

$$\left[ \begin{array}{c} H_2N \quad\quad NH_2 \\ \phantom{x}\diagdown C-R-C\diagdown \\ -O-N \quad\quad\quad N-O-\overset{O}{\underset{\|}{C}}-\overset{O}{\underset{\|}{C}}- \end{array} \right]$$

$$\left[ \begin{array}{c} H_2N \quad\quad NH_2 \\ \phantom{x}\diagdown C-C\diagdown \\ -O-N \quad\quad\quad N-O-\overset{O}{\underset{\|}{C}}-R'-\overset{O}{\underset{\|}{C}}- \end{array} \right]$$

and $$\left[ \begin{array}{c} H_2N \quad\quad NH_2 \\ \phantom{x}\diagdown C-R-C\diagdown \\ -O-N \quad\quad\quad N-O-\overset{O}{\underset{\|}{C}}-R'-\overset{O}{\underset{\|}{C}}- \end{array} \right]$$

wherein R and R′ represent inert divalent hydrocarbon radicals having up to and including 10 carbon atoms, to yield a polymer containing recurring intralinear oxadiazole rings.

12. Polymers consisting essentially of, as recurring units, at least one member of the group consisting of

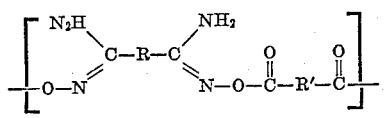

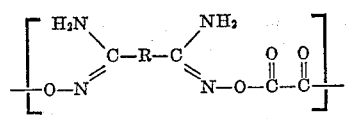

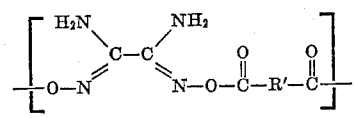

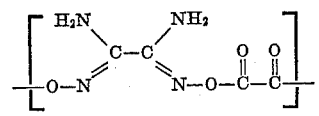

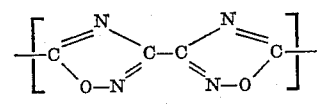

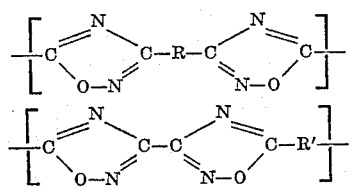

and

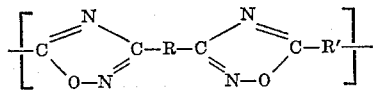

wherein R and R' represent inert divalent hydrocarbon radicals having up to and including 10 carbon atoms.

13. Polymers consisting essentially of recurring units of the formula

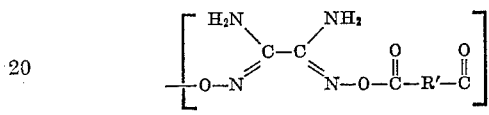

wherein R' represents inert divalent hydrocarbon radicals having up to and including 10 carbon atoms.

References Cited in the file of this patent

Lamb et al.: J. Chem. Soc., 1939, pp. 1253–1257. Copy in Sci. Lib.

UNITED STATES PATENT OFFICE
CERTIFICATE OF CORRECTION

Patent No. 3,044,994            July 17, 1962

Dale Clifton Blomstrom

It is hereby certified that error appears in the above numbered patent requiring correction and that the said Letters Patent should read as corrected below.

Column 11, lines 3 to 8, the first formula should appear as shown below instead of as in the patent:

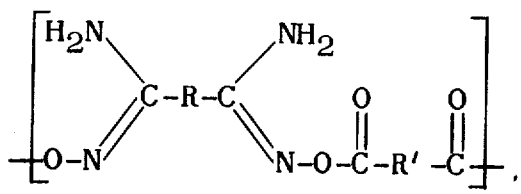

Signed and sealed this 15th day of January 1963.

(SEAL)
Attest:

ERNEST W. SWIDER
Attesting Officer

DAVID L. LADD
Commissioner of Patents